United States Patent
Altamirano et al.

(10) Patent No.: US 9,661,156 B2
(45) Date of Patent: May 23, 2017

(54) ERROR ASSISTANCE USING HEADS-UP DISPLAY

(71) Applicant: TOSHIBA AMERICA BUSINESS SOLUTIONS, INC., Irvine, CA (US)

(72) Inventors: Jose Altamirano, Orlando, FL (US); Marianne Kodimer, Huntington Beach, CA (US)

(73) Assignee: TOSHIBA AMERICA BUSINESS SOLUTIONS, INC., Irvine, CA (US)

( * ) Notice: Subject to any disclaimer, the term of this patent is extended or adjusted under 35 U.S.C. 154(b) by 0 days.

(21) Appl. No.: 14/719,255

(22) Filed: May 21, 2015

(65) Prior Publication Data
US 2016/0344877 A1   Nov. 24, 2016

(51) Int. Cl.
G06K 15/00 (2006.01)
H04N 1/00 (2006.01)
H04N 1/32 (2006.01)

(52) U.S. Cl.
CPC ....... *H04N 1/00079* (2013.01); *H04N 1/0005* (2013.01); *H04N 1/00015* (2013.01); *H04N 1/00129* (2013.01); *H04N 1/00331* (2013.01); *H04N 1/00334* (2013.01); *H04N 1/00342* (2013.01); *H04N 1/00493* (2013.01); *H04N 1/32662* (2013.01); *H04N 2201/0003* (2013.01); *H04N 2201/0082* (2013.01); *H04N 2201/0091* (2013.01); *H04N 2201/0096* (2013.01)

(58) Field of Classification Search
USPC ..................................... 358/1.15, 1.14, 1.13
See application file for complete search history.

(56) References Cited

U.S. PATENT DOCUMENTS

| | | | | |
|---|---|---|---|---|
| 2010/0295665 | A1* | 11/2010 | Landau | G06Q 10/087 340/10.42 |
| 2011/0308638 | A1* | 12/2011 | Hyland | E03B 9/06 137/299 |
| 2012/0136961 | A1* | 5/2012 | Chen | H05B 37/0245 709/217 |
| 2013/0174205 | A1* | 7/2013 | Jacobsen | H04N 21/43637 725/81 |
| 2014/0135971 | A1* | 5/2014 | Park | G06Q 10/043 700/137 |
| 2014/0181891 | A1* | 6/2014 | Von Bokern | H04L 63/20 726/1 |
| 2014/0292498 | A1* | 10/2014 | Hosoya | G06Q 10/00 340/10.51 |

(Continued)

*Primary Examiner* — Jerome Grant, II
(74) *Attorney, Agent, or Firm* — Foley & Lardner LLP

(57) ABSTRACT

According to one embodiment, a system for providing error assistance for a device is disclosed. The error assistance is provided to an optical head-mounted display (OHMD) of a user. The system includes a server configured to receive an input, including one or more identifiers for the device, from the OHMD of the user or a mobile device of the user. The identifiers may include at least one of a serial number of the device, an identifier scanned from a tag of the device, and an error code identifying the device error. The server identifies the device and device error based on the identifiers. The server determines instructions for fixing the device error and generates an augmented display to provide on the OHMD of the user. The augmented display includes an image, icon, text, audio, or video, representative of a part of the device or an instruction for repairing the device.

18 Claims, 6 Drawing Sheets

(56) References Cited

U.S. PATENT DOCUMENTS

2015/0222476 A1\* 8/2015 Kondo ................ H04L 41/5061
  709/223
2015/0287318 A1\* 10/2015 Nair ....................... G08C 17/02
  340/5.52

\* cited by examiner

When a paper jam occurs in Drawer 1, Bypass tray

1. Remove the cassette from Drawer 1.

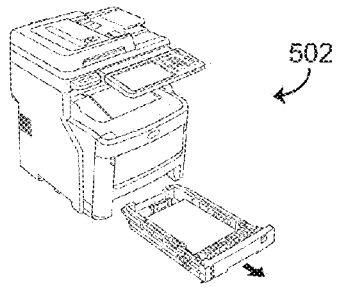
502

2. Remove the jammed paper.
   If you cannot see the jammed paper, do nothing, and proceed to step 3.

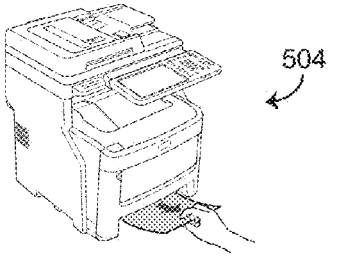
504

3. Put the cassette back.
   If you removed the jammed paper in step 2, this procedure is finished.

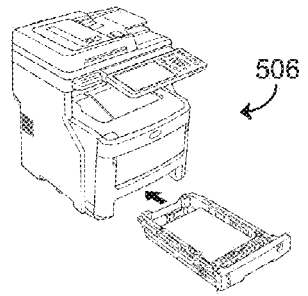
506

4. If the Bypass tray is closed, hold both sides of the Bypass tray, and position it in front of you.

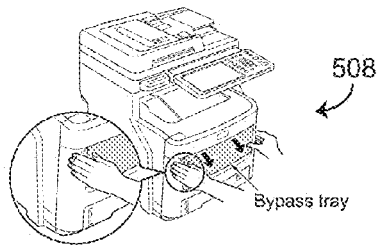
508
Bypass tray

5. Pull the central lever upward, and open the front cover.

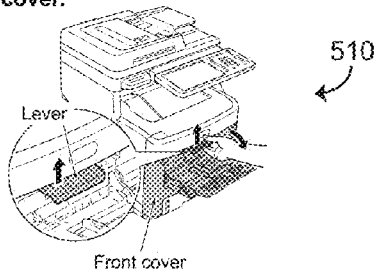
510
Lever
Front cover

6. Pull the jammed paper slowly to remove it.
   - When paper is fed from Drawer 1, or Drawer 2/3/4 (Option)

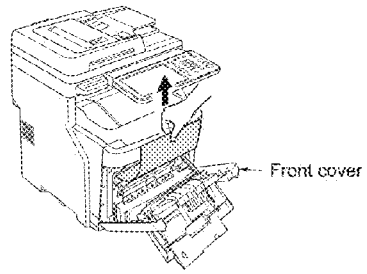
Front cover

- When paper is fed from Bypass tray

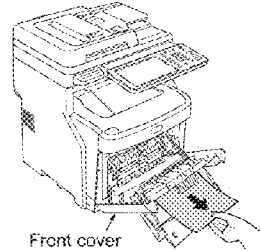
Front cover

7. Close the front cover.

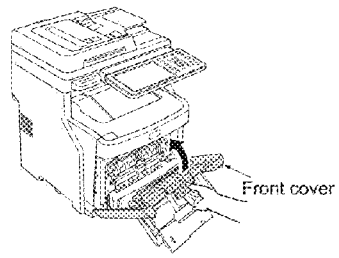
Front cover

8. If the Bypass tray is not in use, close the Bypass tray.

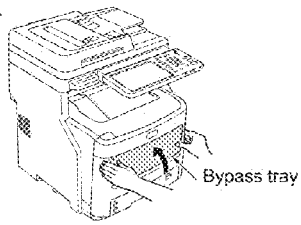
Bypass tray

FIG. 5

ERROR ASSISTANCE USING HEADS-UP DISPLAY

BACKGROUND

Embodiments described herein relate generally to providing error assistance to a user via a wearable transparent display.

It may be challenging for a user to repair a device or perform maintenance on a device, such as a printer device or a copier device. For example, a printer or copier may display an error code or other message indicating a problem with the device. A user may have to look up the error code in a manual, depending on if the user does or does not know what the error code means.

Further, in order the repair the device, the user may have to service the device (e.g., take apart at least a portion of the device, replacing a part in the device, etc.). It may be challenging for the user, as taking apart the device or replacing the part may require the use of a manual, with text and visual aids, since the user may not be familiar with how the device is assembled. Even for a service technician, the use of a manual or other paperwork may be necessary to identify an error of the device and to fix the device.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIG. 5 illustrates example instructions to fix a device error (e.g., a paper jam in a printer device), the example instructions retrieved and generated by the server, according to an exemplary embodiment.

DETAILED DESCRIPTION

Figure 1:
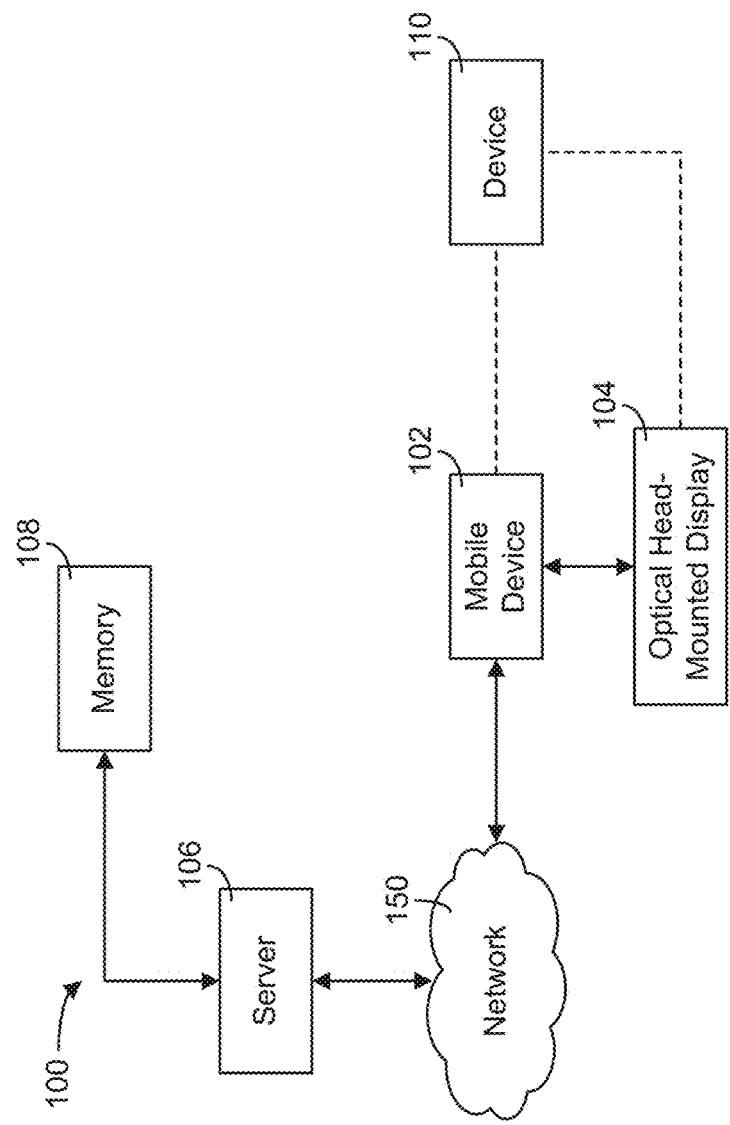
FIG. 1 is a block diagram of an error assistance system, according to an exemplary embodiment.

According to one embodiment, a system for providing error assistance for a device is disclosed. The error assistance is provided to an optical head-mounted display (OHMD) of a user. The system includes a server (or service cloud) configured to receive an input, including one or more identifiers for the device, from the OHMD of the user or a mobile device of the user. The identifiers may include at least one of a serial number of the device, an identifier scanned from a tag of the device, and an error code identifying the device error. The server identifies the device and device error based on the identifiers. The server determines instructions for fixing the device error and generates an augmented display to provide on the OHMD of the user. The augmented display may include an image, icon, text, audio, or video, representative of a part of the device or an instruction for repairing or performing maintenance on the device.

In one embodiment, the system (described as an error assistance system henceforth) may be used to provide assistance to a user wishing to repair a device. For example, an imaging device such as, but not limited to a printer device, copier device, or multifunction peripheral device, or the like, may be inoperable or broken, and may display an accompanying error code. The error assistance system may receive an input from the user, determine the error from the input, and determine how to repair the device. An augmented display may be generated and provided on an OHMD of the user, to guide the user through the repair. As another example, an imaging device may need maintenance (such as, but not limited to adding paper, toner, ink or other consumable material, removing a paper jam or other routine maintenance), and may display an accompanying maintenance code. The error assistance system may guide the user via an augmented display on the OHMD of the use to perform the maintenance on the device.

The OHMD may be, for example, but not limited to a Google Glass device or any other suitable, portable device with a head-up display (HUD). The OHMD is configured to display images and other information to a user wearing the device, for example, to provide the user with an augmented view of reality. The term OHMD is used herein to describe a wearable device. In yet other embodiments, other suitable, portable communication devices with display screens (with or without head-up display capabilities) are employed in place of an OHMD. However, particular embodiments are described herein as employing an OHMD configured to be worn on the head of a user to provide a head-up display that the user can view in conjunction with (to augment) the user's real world view of the immediate environment. In particular embodiments, error information is presented to the user through the OHMD. While Google Glass is mentioned as an example OHMD, it should be understood that the systems and methods herein are implementable for any type of OHMD, or any other similar device capable of providing an augmented reality view to a user of the device. The present disclosure uses the term OHMD to describe the wearable device.

In one embodiment, the error assistance system is configured to receive an input from the OHMD of the user or from a mobile device of the user. For example, the OHMD includes an optical device, configured to capture images or video. The optical device may be, for example, a camera, an optical code recognition device, or the like. The OHMD may capture an image of the device with an error, the image including a view of a device identifier (e.g., a serial number). The device may then be identified by one or more of the OHMD, mobile device, or a remote server.

In one embodiment, the error assistance system is further configured to receive an error indication from the OHMD or mobile device. For example, if the device is a printer device, an error code may be displayed on a panel of the printer device. The OHMD may scan the error code on the printer device and determine the error code via optical character recognition (OCR), may have the error code transmitted wirelessly to it, or may acquire the error code in any other way. The server may then determine an error based on the error code received from the OHMD.

In one embodiment, the server is configured to determine instructions to repair or perform maintenance on the device.

For example, the server may look up instructions to repair the device from a remote source (e.g., a remote database). The instructions may be provided to the OHMD of the user. In various embodiments, text or images may be displayed on the OHMD, icons may be displayed in a position in the head-up display that corresponds to or represents the actual physical location of a part the icon represents, or any other input may be provided to the OHMD which assists a wearer of the OHMD in repairing or performing maintenance on the device. An icon is an image or visual identifier representing the imaging device or part of the imaging device to be removed, moved or operated. As one example, the user may wish to repair an imaging device. An icon representing an imaging device part to be removed may be displayed on the OHMD. The position of the icon on the display corresponds with the actual position of the actual printer device part in view of the user through the OHMD.

In particular embodiments an example of an imaging device error as a device error is described. The use of the error assistance system to repair or maintain an imaging device is provided by way of example only and is not limiting, and it should be understood that the systems and methods herein may be used for other applications. The error assistance system may be used in the maintenance or repairing of any electronic device or other object in which instructions or directions (such as, but not limited to, step-by-step or sequential directions, navigation, etc.) provided to a user on an OHMD is useful. For example, the error assistance system may be used for any electronic device such as an appliance (e.g., stove, dishwasher, washer/dryer, etc.). As another example, a mechanic may use the error assistance system to repair a car, airplane, or any type of vehicle. As another example, the error assistance system may be used to help assemble or repair any type of object (e.g., desk, table, etc.). As another example, the error assistance system may be used by a medical service provider (such as, but not limited to, a doctor, a nurse or other medical care provider) to identify issues with a patient, or by any user wishing to identify an anomaly. In the various embodiments, any combination of an error code scanned by the OHMD, an error indication submitted by the user, a tag identifying the object with an error being scanned by the OHMD, or another user input may be used to identify an error to be repaired.

Referring now to FIG. 1, a block diagram of error assistance system 100 is shown, according to an exemplary embodiment. The system 100 is shown to generally include a mobile device 102 and an OHMD 104 of a user. Instructions (e.g., device error assistance) are provided to the user via the mobile device 102 and the OHMD 104. The system 100 is further shown to include a server 106 (or service cloud) configured to generate instructions to repair the device and to provide the instructions to the user. The server 106 may be communicably connected to a memory 108 or other data store. The memory 108 may include information (e.g., error code definitions, instructions, etc.) to help the server 106 generate the error assistance information. The memory 108 may be local or remote to the server 106 (e.g., memory may be in a centralized location or may be remote of the system 100).

The system 100 is further shown to include a device 110. The device may have an error that the user wishes to repair, or may require maintenance. The device 110 may be, for example, an imaging device such as a printer device, copier device, or multifunction peripheral device. The device 110 is shown in range of the user, and more particularly the mobile device 102 and the OHMD 104 (illustrated by the dashed line in FIG. 1). In one embodiment, the OHMD 104 is configured to scan the device 110. By scanning the device, a device identifier (e.g., a serial number) and an error code may be recognized (e.g., via OCR to convert the error code image to an alphanumeric value) by the OHMD 104 or the server 106.

In one embodiment, the device 110 may be connected to the server 108 via a wired or wireless connection. For example, the device 110 may communicate an error code to the server 108, which may facilitate the activities described herein. In another embodiment, the device 110 is not communicably connected to the server 106 or any other component of the system 100, and the server 106 identifies the device based on an input from the OHMD 104 and the mobile device 102. Embodiments of the systems and methods described herein may be implemented with or without the device connected to other components of the system 100.

The OHMD 104 may be any wearable device that is configured to provide an augmented reality view to a wearer of the device. The OHMD 104 may be, for example, a Google Glass device; however it should be understood that the systems and methods herein are implementable for any type of OHMD.

In one embodiment, the OHMD 104 is a standalone device capable of wireless communication with the server 106. In another embodiment, the OHMD 104 is paired with the mobile device 102, such as a smartphone. In one embodiment, the activities described herein may be implemented for an OHMD 104 and mobile device 102. In another embodiment, the OHMD 104 may operate in the system 100 without a mobile device. In yet another embodiment, the activities described as being executed by the mobile device 102 may be executed by the OHMD 104, and vice versa.

The server 106 is configured to provide error assistance information to a user of the mobile device 102 and the OHMD 104. In one embodiment, the error assistance information is or includes instructions for repairing the device. In another embodiment, the error assistance information is or includes instructions for performing maintenance on the device. The server 106 determines the device error based on user input and retrieves information relating to the error from memory 108. The server 106 determines instructions from the retrieved information and is configured to provide the directions in various formats. For example, the server 106 may transmit one or more images or videos for display on the OHMD 104, each image or video illustrating a particular instruction in the process of repairing the device. As another example, the server 106 may transmit an image to be positioned on the OHMD 104. The image may be, for example, a specific part of the device, the image overlapping the user's actual view of the specific part on the OHMD 104.

The various components of the error assistance system 100 may be connected to one another (either wirelessly or via a wired connection) via a network 150. The network 150 may be any form of computer network that relays information between the mobile device 102, the OHMD 104, the server 106 and the devices 110. The network 106 may include the Internet and/or other types of data networks, such as a local area network (LAN), a wide area network (WAN), a cellular network, satellite network, or other types of data networks. The network 106 may also include any number of computing devices (e.g., computer, servers, routers, network switches, etc.) that are configured to receive and/or transmit data within the network 106. The network 106 may further include any number of hardwired and/or wireless connections.

Figure 2:
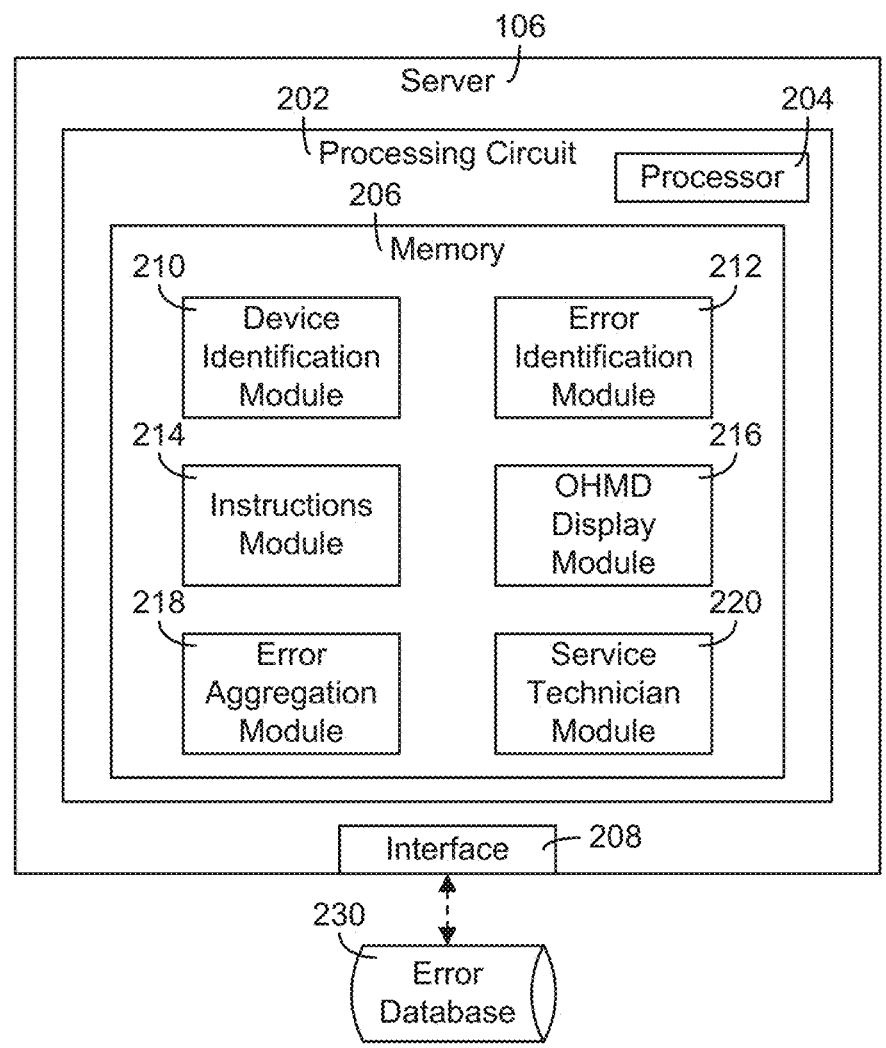
FIG. 2 is a detailed block diagram of a server of an error assistance system, configured to execute various functionalities of the error assistance system, according to an exemplary embodiment.

Referring to FIG. 2, the activities of the server 106 are described in greater detail. The server 106 may include a processing circuit 202 including a processor 204 and memory 206 configured to execute the activities of the server 106 described herein. The processor 204 may be implemented as a general purpose processor, an application specific integrated circuit (ASIC), one or more field programmable gate arrays (FPGAs), a group of processing components, or other suitable electronic processing components. The memory 206 is one or more devices (e.g., RAM, ROM, flash memory, hard disk storage, etc.) for storing data and/or computer code for completing and/or facilitating the various processes described herein. Memory 206 may be or include volatile memory or non-volatile memory. Memory 206 may include database components, object code components, script components, or any other type of information structure for supporting the various activities and information structures of the present disclosure.

Figure 4:
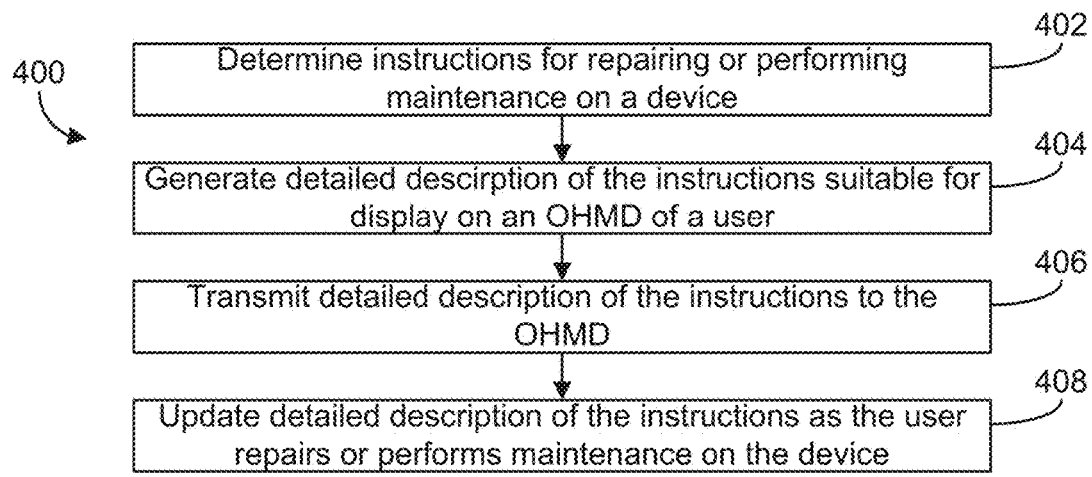
FIG. 4 is a flow chart of a process for providing instructions to fix a device error on an OHMD of the user, according to an exemplary embodiment.

In one embodiment, the server 106 is a centralized server, and all computing in the error navigation systems occurs at the centralized server. In another embodiment, the server 106 is a decentralized server, and resources for computing in the error assistance system may be distributed to various servers in various locations. The server 106 is shown as a single server in FIG. 4; in other embodiments the modules as shown in FIG. 4 may be executed across various servers.

The memory 206 is shown to include various modules for completing the activities described herein. The memory 206 is shown to include a device identification module 210 configured to identify a device with an error or maintenance request. In one embodiment, the device identification module 210 receives an input from a mobile device or OHMD of a user, and the input is used to identify the device. The identification of the device may then be used to generate instructions specifically for the device.

In one embodiment, the user may capture an image of the device via an optical device of the OHMD. For example, the OHMD may include a camera configured to capture images and video. As another example, the OHMD may include an optical code recognition device. The image may include various identification information. For example, a serial number or other such identifier may be visible on the housing of the device. The optical device may capture the image including the serial number, and the device identification module 210 or the optical code recognition device of the OHMD may use image recognition capabilities to determine the serial number. The serial number may then be checked against a database to determine the identity of the device. Other identifiers may include a name or brand of the device (e.g., a particular brand of a printer). In one embodiment, the size or shape of the device may be used to assist in identifying the device. In one embodiment, the device may be part of a local network of devices. The identifying information may include a name or ID of the device in the local network (e.g., "printer_1" in a network including several printers, all named similarly), and the device identification module 210 may retrieve information via the local network of devices to identify further details about the device.

In one embodiment, the device may include a tag. The OHMD or mobile device of the user may scan one or more tags of the device. The device tag may include pre-stored information about the device. For example, a tag may identify a serial number of the device, a device name or ID, a device location, or otherwise. Tag information may then be transmitted to the device identification module 210 and used to identify the device. The tag may be a barcode, QR code, RFID tag, or any other type of optical or readable tag. The mobile device or OHMD of the user may be configured to scan the tag via WiFi, frequency modulation (FM), Bluetooth (BT), near field communication (NFC), or via any other suitable communication link with the tags.

The memory 206 is shown to include an error identification module 212 configured to identify an error of an identified device. In one embodiment, the error identification module 212 receives an input from a mobile device or OHMD of a user, and the input is used to identify the error. The input may be the same input as provided to the device identification module 210, or may be provided independently of any input provided for device identification. The error identified may be any type of issue relating to device functionality. For example, if the device is a printer device, the issue may relate to a paper jam, low toner, if the device cannot connect with other devices in a local network, mechanical problems, etc. The issue or error may be even more specific (e.g., where in the printer device the paper jam is located, how low the tone is in terms of percentage, etc.). The issue may vary in importance (e.g., a low toner may allow for continued operation of a printer device, while the toner being out requires more immediate attention) and may be indicated as such by the error identification module 112.

In one embodiment, the error identification module 212 may receive a captured image from the OHMD of the user. The captured image may include a view of an error message displayed on the device (e.g., an error code on a display panel of an imaging device). The error identification module 212 may be configured to use image recognition capabilities to determine the error code. The error code may then be used to identify the error (either based on information stored at the server 106 about the error code, or based on information retrieved from a remote database 230).

The error may be identified in other ways. For example, the error identification module 212 may receive the captured image and may determine the error by visually analyzing the device in the image (if the error is visible). As another example, the error identification module 212 may or may not require the device to be identified before the device error. An error code describing a particular type of device error may vary based on the type of device. The error identification module 212 may receive device information from the device identification module 210 to assist in identifying the error. As another example, the error identification module 212 may identify an error via an error code which is specific to a type of device, and may assist the device identification module 210 in identifying the device.

In one embodiment, the error may be identified without the use of a mobile device or OHMD. For example, a device may be communicably connected to the server 106 and may transmit an error code (and other device information) to the server. In one embodiment, the user may provide an error code or error description to the server 106 without any interaction with the device (e.g., without the OHMD scanning the device). For example, the user may verbally enter an error code or description to the OHMD or mobile device, via a microphone or other audio input device, for transmission to the server 106. As another example, the user may enter an error code or description via text. The server 106 may receive the user input and determine the error from the user input independently of any information retrieved from the device itself.

While the error identification module 212 is described as identifying a device error, and the error code is described as representing a particular device error, in another embodiment, the error code may represent a particular maintenance process for the device. For example, for a printer device, an error code may represent a maintenance process such as cleaning the printer head, changing printer parts such as the roller, and removing dust or other debris from the printer device. The error identification module 212 may then identify the maintenance process associated with the error code and provide instructions as described above.

The memory 206 is shown to include an instructions module 214 configured to determine instructions for repairing a device with an identified error. Once the device and device error are identified, the instructions module 214 may be configured to determine the appropriate way to repair the device, which may include instructions for a user of the device.

In one embodiment, the instructions module 214 is configured to look up a fixed routine for the error. For example, an error database 230 may store fixed routines for various errors or maintenance procedures for a device. The fixed routines may be stored in the error database 230 based on an error code associated with each routine (e.g., each routine includes an identifier associated with the error code for the error the routine addresses). The instructions module 214 may be configured to retrieve the routine from the error database 230. The error database 230 may be local to or remote from the server 106, according to various embodiments. In one embodiment, the instructions module 214 may be configured to access any other local or remote source for retrieving a fixed routine for the error or maintenance procedure.

In one embodiment, the retrieved information may include a textual description of the fixed routine. In another embodiment, the retrieved information may include images or video illustrating the fixed routine. In another embodiment, the retrieved information may include an exploded view of the device or parts of the device, not specific to any particular instruction of the fixed routine, that may be provided to assist a user. In other embodiments, any combination of the above may be included.

Memory 206 is shown to include an OHMD display module 216 configured to transmit information to an OHMD of a user. The OHMD display module 216 may configure a display on the OHMD, the display assisting the user in repairing or performing maintenance on the device. The OHMD display module 216 may use a fixed routine or other information from the instructions module 214 to generate the display.

In one embodiment, instructions to repair the device may be displayed on the OHMD. The OHMD display module 216 may be configured to generate a display (or other output) on the OHMD that includes text, images, audio, or videos that highlight each particular instruction of the process. For example, an image of a printer device part to be removed may be displayed in one corner of the OHMD view. As another example, a textual description of the instruction may be displayed across the bottom of the OHMD view. As yet another example, a video illustrating the removal of a printer device part may be played back on the OHMD. In other embodiments, multiple instructions may be displayed, any combination of images, video, and text may be displayed, an audio output may be provided on the OHMD with instructions for repairing or performing maintenance on the device, or otherwise. The OHMD display module 216 may be configured to adjust the display based on the type of OHMD being used by the user, conditions surrounding the OHMD, or any other factor.

In one embodiment, the OHMD may provide an image on the display to the user. For example, assume that a user is looking at a printer device and is attempting to repair the printer device. The OHMD may be configured to highlight a particular printer device part (e.g., a part that is to be removed). The OHMD may be configured to display an icon. An icon may be an image or visual identifier representing the imaging device or imaging device part to be removed, moved or operated, an instruction or other visual cue, etc. An icon may represent a printer device part, with the view of the icon overlapping with the view of the actual printer device part in the display (see FIGS. 5-7 for an example). The OHMD may further be configured to enhance the printer device part in any other way (e.g., by using flashing lights, creating a border around a part, or by using another visual output). The OHMD display module 216 may be configured to generate the display and display settings for the OHMD.

If an icon is to be provided in the view of the OHMD, then it may be necessary to track the position of the user and OHMD in order to display the icon in the proper location. Therefore, the activities of the OHMD display module 216 may include detecting a user position. For example, the OHMD of the user may include a gyroscope, accelerometer, or any other component for tracking the current user position and view, in what direction the user is looking, and if the user is moving around. The OHMD display module 216 may use image recognition to determine if the user is looking at the device, and what part of the device the user is looking at. The OHMD display module 216 then configures a display for the OHMD, and updates the position of text, images, and video on the display as the user moves around while repairing the device. The OHMD display module 216 may further provide any calibration process necessary to properly position the image on the display.

In one embodiment the OHMD display module 216 may be configured to track the user's progress in repairing the device. Based on the progress, the OHMD display module 216 may know when to progress to a next instruction of a fixed routine. For example, the OHMD display module 216 may receive an input from the OHMD, the input relating to images or video of a user performing an instruction in the fixed routine. The OHMD display module 216 may confirm the instruction was completed (or determine that the instruction was not properly completed) and may then provide a display for the next instruction to be executed. For example, if the user is removing a part in a printer device, the OHMD display module 216 may first confirm that the part was properly removed before providing a display for a subsequent instruction. While such a confirmation instruction is described as happening at the OHMD display module 216, the server 106 may include a module dedicated for confirmations.

The server 106 and memory 206 may further include various modules for providing additional features of the error assistance system 100. For example, the memory 206 may include an error aggregation module 218. The error aggregation module 218 may aggregate instances in which assistance (e.g., device error assistance, maintenance assistance) is provided to a user. For example, the error aggregation module 218 may track how many times a particular device has an error, a particular brand of a device has an error, a particular group of devices have an error, etc. The error aggregation module 218 may then determine if a problem with a particular device or set of devices is recurring (e.g., a printer device that continually has a paper jam or a part break down).

In one embodiment, the error aggregation module 218 may track if a user was successful in repairing the device. This may allow the error aggregation module 218 to track if a fixed routine is always successfully implemented or if some or all users have problems with the fixed routine. This may further allow the error aggregation module 218 to determine if some devices are easier to repair than others, if some users are better at repairing devices than others, or likewise.

The memory 206 may include a service technician module 220 configured to provide information to a service technician, or other user responsible for the device with an error. The service technician module 220 may provide error aggregation information from the module 218 that may detail previous history of an error and/or the device. In one embodiment, the service technician module 220 may alert a service technician (e.g., the service technician closest to the device) of a particular device error and direct the technician to the device.

The memory 206 may further include other modules to assist in an error assistance system. For example, the server 106 may provide directions or other navigation information to help a user find a device with an error or a device part needed to repair the device. As another example, the server 106 may include a location module configured to identify the location of a device and/or user. As another example, the server 106 may connect an OHMD or mobile device of the user with a remote source that includes error information (e.g., from a manual), and may allow the user to browse the remote source for general device information. For example, general device information may include error code information, an exploded or perspective view of a device, or otherwise.

The server 106 is shown to include a communications interface 208 configured to facilitate communications with the user via a mobile device or OHMD, and in some embodiments with the device with the error. The interface 208 may be any type of wired and/or wireless interface.

Figure 3:
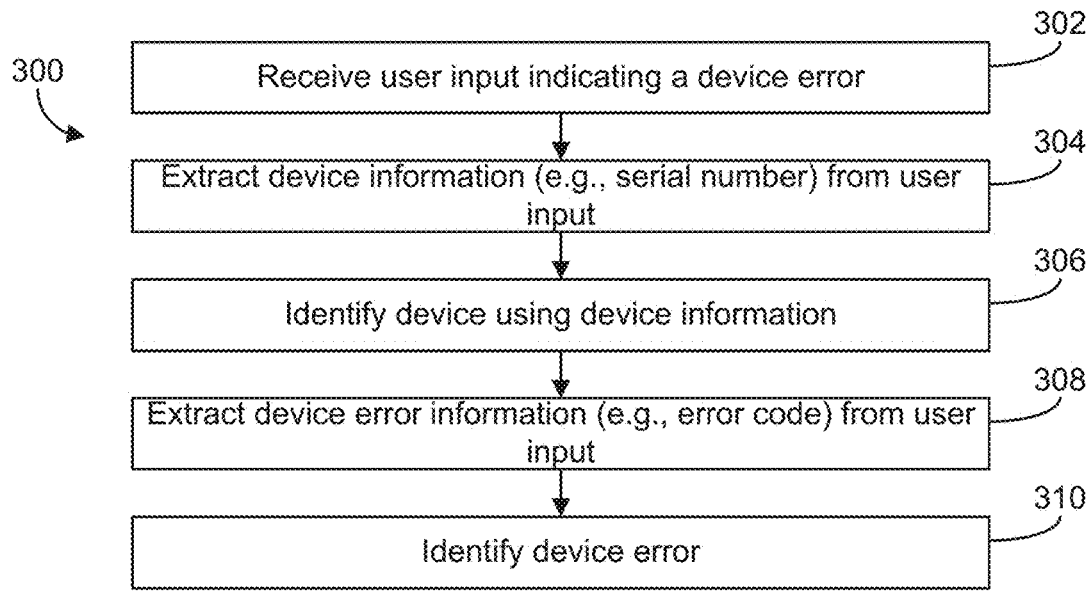
FIG. 3 is a flow chart of a process for identifying a device and a device error, according to an exemplary embodiment.

Referring now to FIG. 3, a flow chart of a process 300 for identifying a device and device error is shown, according to an exemplary embodiment. The process 300 may be executed by, for example, the server 106.

The process 300 includes receiving a user input indicating a device error (block 302). In one embodiment, the user input is provided by a mobile device or OHMD of the user. The mobile device or OHMD may wirelessly connect to the server and provide the user input. In one embodiment, the user input may be an image or video of a device and error code displayed on the device. In another embodiment, the user input may be a text input describing the device and device error, may be an audible request recorded by the mobile device or OHMD, or may be any other type of user input. Process 300 further includes extracting device information from the user input (block 304). For example, extracting device information may include using image recognition on an image to identify a serial number printed on the housing of the device. As another example, extracting device information may include identifying information retrieved by a tag (e.g., QR code, RFID tag, etc.) associated with the device. The process 300 further includes identifying the device using the extracted information (block 306). For example, the block 306 may include looking up a serial number in a local or remote database to identify the device. The block 306 may include identifying the type of device and may further include identifying a specific device (e.g., a specific printer device in an office).

The process 300 further includes extracting device error information from the user input (block 308). For example, the block 308 may include using image recognition on an image to identify an error code displayed on a panel of the device. As another example, a user may provide a text description or audible input of the error code, and the block 308 includes extracting the information from the user input. The process 300 further includes identifying the device error (block 310). The block 310 may include, for example, looking up an extracted error code in a database of error codes. The database may include error code details (e.g., what part of the device is broken or malfunctioning, if repairing the device will require particular parts or a service technician, etc.).

Referring now to FIG. 4, a flow chart of a process 400 for providing instructions to repair a device on an OHMD of the user is shown, according to an exemplary embodiment. The process 400 may be executed by, for example, the server 106 upon determining the existence of a device error and a user wishing to repair the device.

The process 400 includes determining instructions for repairing or performing maintenance on a device (block 402). The block 402 may include retrieving instructions from a local or remote database. For example, an error database including error code information may include information relating to how to repair the device.

The process 400 further includes generating a detailed description of the instructions suitable for display on an OHMD of the user (block 404). For example, the server is generally configured to provide the instructions through an OHMD of the user as the user attempts to repair the device. The block 404 may include determining how to display the instructions. In one embodiment, the detailed description may be displayed as text on the OHMD. In another embodiment, the detailed description may be displayed as one or more images. The images may indicate the layout of the device, a device part to be removed, installed, or modified, may illustrate how to remove or rotate a device part, or otherwise. In one embodiment, the images may be displayed in a corner of the OHMD. In another embodiment, the image is displayed in the OHMD such that the device or device part the image corresponds with or represents the user's actual view of the device or device part. In another embodiment, the detailed description may be displayed as one or more videos, configured for playback on the OHMD of the use. In another embodiment, the detailed description may include arrows to highlight particular device parts, circles or other shapes to place a border around a particular device part, or otherwise. In yet other embodiments, any combination of the above may be provided to the OHMD of the user. The process 400 further includes transmitting the detailed description to the OHMD (block 406).

The process 400 further includes updating the detailed description of the instructions as the user repairs the device (block 408). For example, upon user verification that a particular instruction was completed, at the block 408, an updated description of the instructions (e.g., a next instruction, the next step in step-by-step directions, etc.) is provided to the OHMD of the user. In one embodiment, the block 408 may include updating the instructions based on a failure to implement a particular instruction, may include verifying that a particular instruction was executed properly, or otherwise.

While the processes 300, 400 are described independent of one another, in one embodiment, the processes 300, 400 may be executed one after the other.

Figure 6:
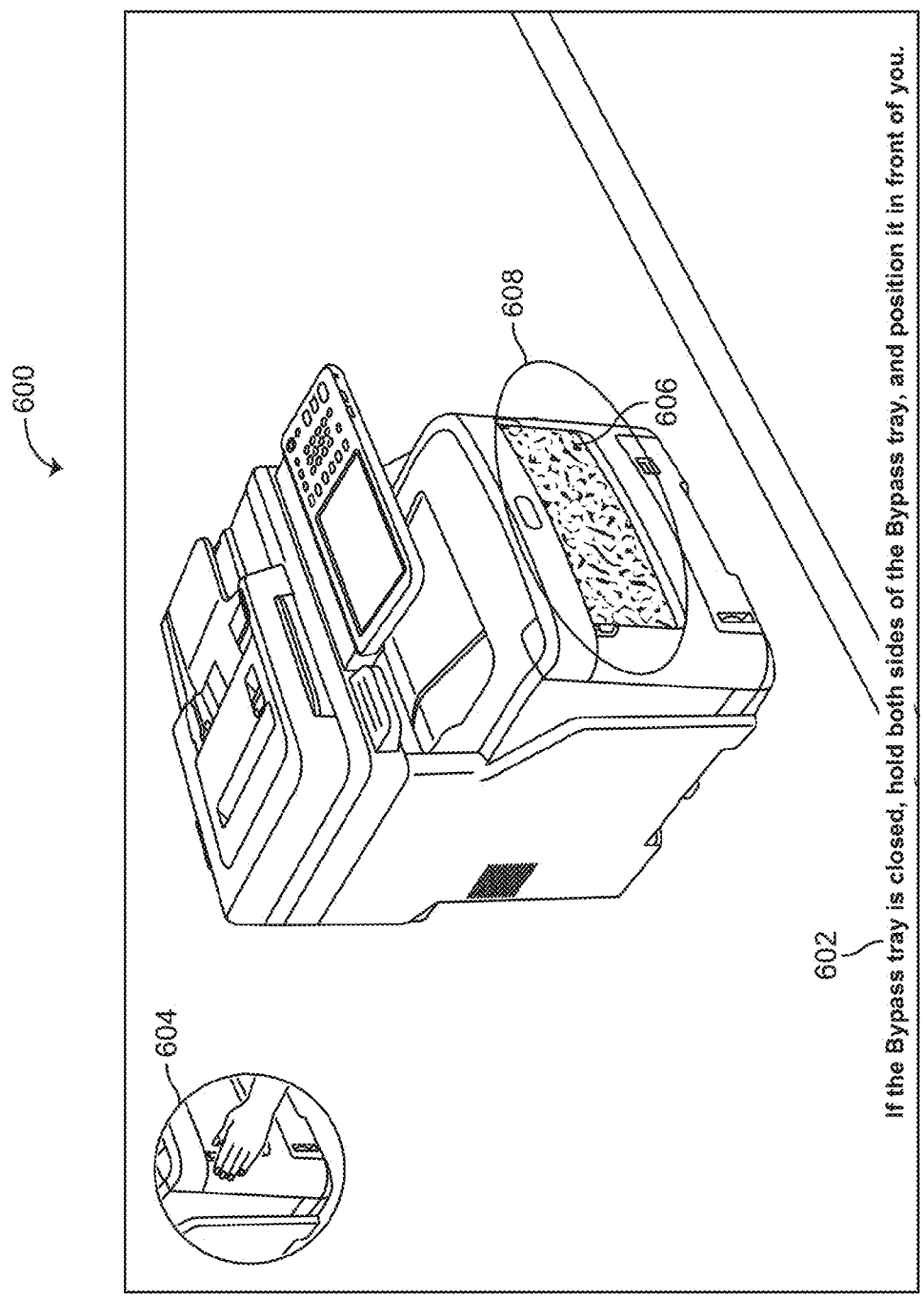
FIGS. 6-7 are example head-mounted display (OHMD) views presented to a wearer of the device, including various features provided by the error assistance system, according to an exemplary embodiment.
Figure 7:
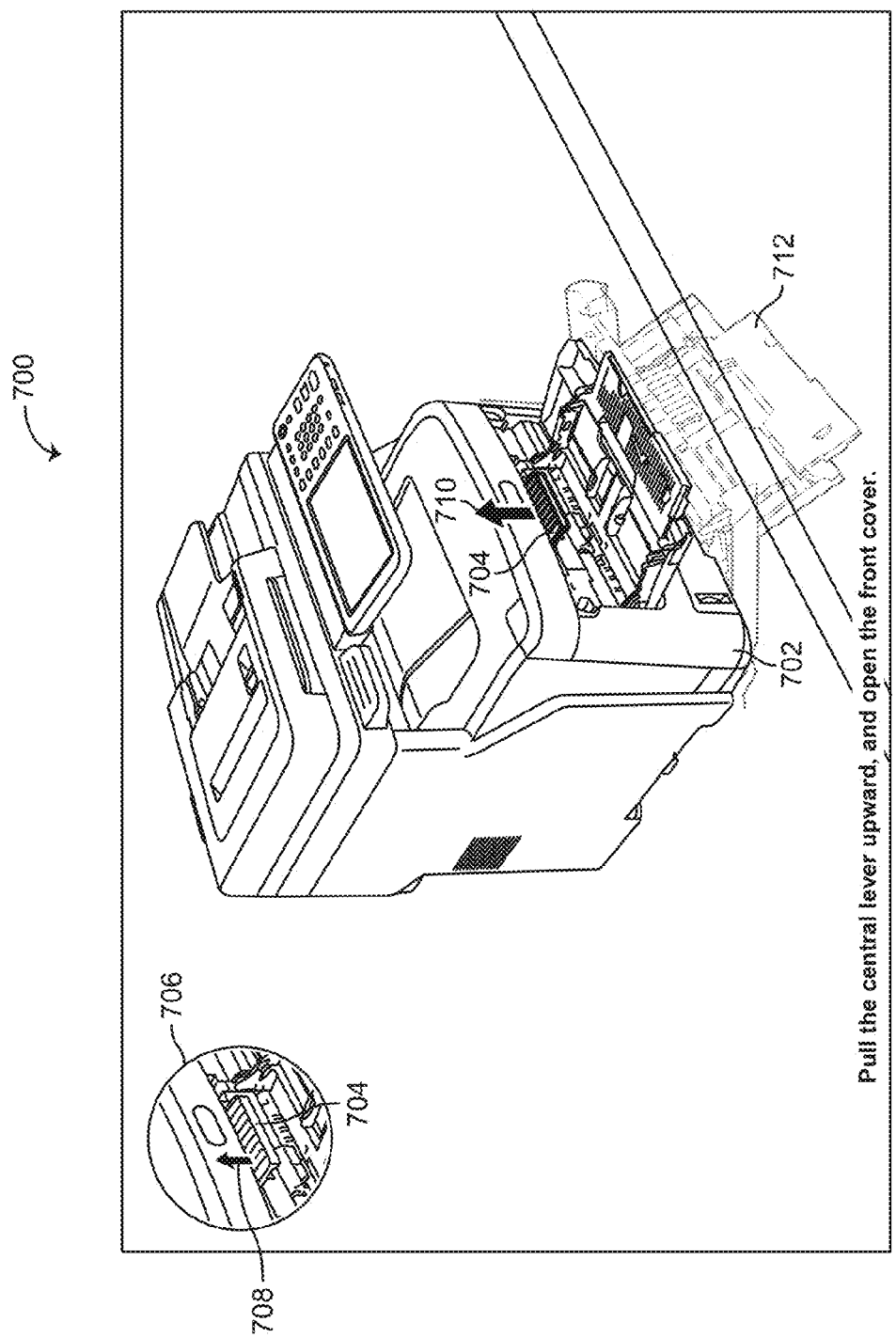

Referring generally to FIGS. 5-7, an example implementation of the systems and methods described is shown. In one embodiment, the error assistance system may be used by a user to repair a device such as an imaging device. In the example of FIGS. 5-7, an error (e.g., a paper jam) for an imaging device (more particularly, a printer device) is illustrated, and example instructions that may be provided to an OHMD of a user are shown. The server 106 may receive a serial number (or other device identifier) and error code (or other error identifier) from the OHMD or mobile device of a user. The server 106 may then look up the instructions for repairing the device as described above. In the example of FIGS. 5-7, the error identifier identifies a paper jam in a printer device.

Referring to FIG. 5, example instructions for removing a paper jam in a printer device are shown. These instructions may be looked up by a server 106 of the error assistance system 100 as described above. A total of eight instructions are illustrated, each instruction including a text description of the instruction and a visual aide (e.g., one or more images) illustrating how the instruction is to be executed. The server 106 may retrieve these instructions from an error database either local to or remote from the server. The server 106 may then configure the instructions for presentation on an OHMD of a user.

In one embodiment, the instructions provided for presentation on the OHMD may vary based on how the user is handling the device error. For example, an instruction 502 may first be provided to the user. The instruction 502 instructs the user to remove the cassette from drawer 1. If the user can see the jammed paper, the user may be instructed to remove the paper at an instruction 504. However, if the user indicates that he or she cannot see the jammed paper, or cannot remove the jammed paper, or if the server receives an input from the OHMD that indicates that the jammed paper is not visible, then the server 106 may no longer display the instruction 504 on the OHMD of the user, and may display an instruction 506 instead. In other words, the server 106 adjusts the instructions provided to the user based on the current situation.

Referring also to FIG. 6, an example OHMD view 600 presented to a wearer of the device is shown. The device with the error is fully in the view of the OHMD as shown. In this example, the user has progressed to an instruction 508, which instructs the user to interact with the bypass tray of the printer device.

In one embodiment, a text description of the next instruction may be presented to the user. A text description 602 is shown at the bottom of the OHMD view (e.g. "If the Bypass tray is closed, hold both sides of the Bypass tray, and position it in front of you"). Further, an image 604 is displayed in the upper left corner of the OHMD view. The image may show how the user is to interact with a printer device part. More specifically, in this example, the image 604 shows the user how to position his or her hand on the bypass tray compared to the position of the bypass tray.

In one embodiment, server 106 may highlight the location of the bypass tray 606. For example, the bypass tray 606 is shown with a shading (or other highlight) overlaid on the OHMD view. The shading indicates the part of the printer device the user is to interact with. In other embodiments, only the sides of the bypass tray 606 may be shaded, indicating the particular position on the printer device the user should place his or her hand on.

In one embodiment, the server 106 may highlight the location of the bypass tray 606 with an oval 608. In various embodiments, the server 106 may display any shape, any arrow, or any other indicator to illustrate the location of the bypass tray 606.

Continuing with the example, FIG. 7 illustrates another example OHMD view 700. In this example, the user has progressed to an instruction 510 for opening the front cover 702 of the printer device. The user is to be instructed to pull the central lever 704 of the printer device upward to open the front cover.

In one embodiment, in the image 706, an additional arrow 708 is provided. This illustrates to the user how to move the central lever (e.g., pulling it upward). A similar arrow 710 is provided overlaid on the main view of the OHMD view.

In one embodiment, an image may be overlaid over the central lever 704. For example, as shown in FIG. 7, an image of the central lever is overlaid over the actual view of the central lever 704. This overlaying is illustrated by the bolder lines in FIG. 7; it should be understood that the overlaid image may be any type of enhanced image that illustrates the position of the central lever relative to the rest of the printer device.

At the instruction 510, the user is to open the front cover 702, leaving the front cover in a new position. The server 106 may be configured to display the new position of the front cover to assist the user. An image 712 is provided on the OHMD display, which is shown as partially transparent and grayed out. The image 712 represents the new position for the front cover when the front cover is properly opened. In one embodiment, the server 106 may determine, based on input from the OHMD, when the front cover has been lowered to a proper position, and then may proceed to the next instruction.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A system for providing assistance to an optical head-mounted display (OHMD) of a user, the assistance relating to a device with an error or maintenance request, the system comprising a server configured to:
   receive an input from the OHMD of the user or a mobile device of the user, the input comprising one or more identifiers;
   identify a device and a device error or device maintenance request based on the identifiers;
   determine instructions for repairing the device; and
   generate an augmented display to provide on the OHMD of the user, the augmented display including information relating to instructions for repairing the device displayed in conjunction with the user's view of the user's environment on the OHMD;
   wherein the input received form the OHMD includes an image of a portion of the device displaying an error code, and wherein the server is configured to identify the device and the device error or device maintenance request based on carrying out optical character recognition of the image of the portion of the device displaying the error code.

2. The system of claim 1, wherein the device is an imaging device such as a printer device or a copier device.

3. The system of claim 1, wherein the augmented display comprises a textual representation of at least one of the instructions for repairing the device and an image of a part of the device related to the at least one of the instructions.

4. The system of claim 1, wherein the augmented display comprises an image of at least one of a circle, and arrow, and an icon to be displayed at a location on the OHMD where a particular part of the device appears to the user on the OHMD.

5. The system of claim 1, wherein generating the augmented display comprises providing to display on the OHMD at least one of:
   text describing an instruction in the process of repairing the device; and
   images, video, or audio illustrating an instruction in the process of repairing the device.

6. The system of claim 1, wherein the server is further configured to aggregate information about assistance provided to users;
   wherein the aggregated information is used by the server to identify recurring or common device errors and device maintenance requests.

7. The system of claim 1, wherein the server is further configured to receive an input from one or more devices communicably connected to the server; and to
   provide a notification to one or more users based on the input;
   wherein the input relates to a device error or device maintenance request.

8. A system for providing assistance to an optical head-mounted display (OHMD) of a user, the assistance relating to a device with an error or maintenance request, the system comprising a server configured to:
   receive an input from the OHMD of the user or a mobile device of the user, the input comprising one or more identifiers;
   identify a device and a device error or device maintenance request based on the identifiers;
   determine instructions for repairing the device; and
   generate an augmented display to provide on the OHMD of the user, the augmented display including information relating to instructions for repairing the device displayed in conjunction with the user's view of the user's environment on the OHMD;
   wherein the input received from the OHMD comprises scanned information obtained by scanning the device, comprising at least one of:
   a serial number of the device; and
   an identifier scanned from a tag associated with the device.

9. The system of claim 8, wherein determining instructions for repairing the device comprises:
   searching a predefined database of error codes for the device and comparing the error code to the database of error codes.

10. A method for providing assistance to an optical head-mounted display (OHMD) of a user, the assistance relating to a device with an error or maintenance request, the method comprising:
    receiving, with a server, an input from the OHMD of the user or a mobile device of the user, the input comprising one or more identifiers;
    identifying a device and a device error or device maintenance request based on the identifiers;
    determining instructions for repairing the device; and
    generating an augmented display to provide on the OHMD of the user, the augmented display including information relating to instructions for repairing the device displayed in conjunction with the user's view of the user's environment on the OHMD;
    wherein receiving, with a server, an input from the OHMD of the user of a mobile device of the user includes receiving a scanned image of a portion of the device displaying an error code, and
    wherein identifying a device and a device error or device maintenance request includes identifying the device and the device error or device maintenance request based on carrying out optical character recognition of the scanned image of the portion of the device displaying the error code.

11. The method of claim 10, wherein the device is an imaging device such as a printer device or a copier device.

12. The method of claim 10, wherein generating the augmented display comprises generating a textual representation of at least one of the instructions for repairing the device and an image of a part of the device related to the at least one of the instructions.

13. The method of claim 10, wherein generating the augmented display comprises generating an image of at least one of a circle, and arrow, and an icon to be displayed at a location on the OHMD where a particular part of the device appears to the user on the OHMD.

14. The method of claim 10, wherein generating the augmented display comprises providing to display on the OHMD at least one of:
    text describing an instruction in the process of repairing the device; and
    images, video, or audio illustrating an instruction in the process of repairing the device.

15. The method of claim 10, wherein the server is further configured to aggregate information about assistance provided to users and wherein the aggregated information is used by the server to identify recurring or common device errors and device maintenance requests.

16. The method of claim 10, wherein the server is further configured to receive an input from one or more devices communicably connected to the server; the method further comprising:
    providing, with the server, a notification to one or more users based on the input;
    wherein the input relates to a device error or device maintenance request.

17. A method for providing assistance to an optical head-mounted display (OHMD) of a user, the assistance relating to a device with an error or maintenance request, the method comprising:
    receiving, with a server, an input from the OHMD of the user or a mobile device of the user, the input comprising one or more identifiers;
    identifying a device and a device error or device maintenance request based on the identifiers;
    determining instructions for repairing the device; and
    generating an augmented display to provide on the OHMD of the user, the augmented display including information relating to instructions for repairing the device displayed in conjunction with the user's view of the user's environment on the OHMD;
    wherein receiving an input from the OHMD of the user or a mobile device of the user includes receiving the input comprising scanned information obtained by scanning the device, the scanned information comprising at least one of:
    a serial number of the device; and
    an identifier scanned from a tag associated with the device.

18. The method of claim 17, wherein determining instructions for repairing the device comprises:

searching a predefined database of error codes for the device and comparing the error code to the database of error codes.

\* \* \* \* \*